United States Patent
Zhang et al.

(10) Patent No.: US 12,269,503 B2
(45) Date of Patent: Apr. 8, 2025

(54) METHOD OF ANTICIPATORY CONTROL FOR AUTOMATED DRIVING

(71) Applicant: GM Global Technology Operations LLC, Detroit, MI (US)

(72) Inventors: Yubiao Zhang, Sterling Heights, MI (US); Bakhtiar B. Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 242 days.

(21) Appl. No.: 18/055,953

(22) Filed: Nov. 16, 2022

(65) Prior Publication Data

US 2024/0157963 A1    May 16, 2024

(51) Int. Cl.
*B60W 60/00*    (2020.01)
*B60W 50/00*    (2006.01)

(52) U.S. Cl.
CPC ...... *B60W 60/001* (2020.02); *B60W 50/0097* (2013.01); *B60W 2050/0028* (2013.01); *B60W 2552/15* (2020.02); *B60W 2552/40* (2020.02)

(58) Field of Classification Search
CPC ........... B60W 60/001; B60W 50/0097; B60W 2050/0028; B60W 2552/15; B60W 2552/40
See application file for complete search history.

(56) References Cited

U.S. PATENT DOCUMENTS

| | | | | |
|---|---|---|---|---|
| 10,671,075 B1 * | 6/2020 | Kobilarov | ............ | G05D 1/0088 |
| 10,831,210 B1 * | 11/2020 | Kobilarov | ......... | B60W 60/0013 |
| 2009/0037062 A1 * | 2/2009 | Lee | ...................... | B60W 30/143 |
| | | | | 701/70 |
| 2010/0145575 A1 * | 6/2010 | Switkes | ............... | B62D 15/025 |
| | | | | 701/41 |
| 2016/0107682 A1 * | 4/2016 | Tan | ................. | B60W 30/18163 |
| | | | | 701/41 |
| 2019/0361454 A1 * | 11/2019 | Zeng | .................... | G05D 1/0274 |
| 2021/0046924 A1 * | 2/2021 | Caldwell | ................ | G08G 1/166 |

(Continued)

OTHER PUBLICATIONS

Mori, "Vehicle Cornering Characteristics in Acceleration and Braking through Attitude Control of Front and Rear Tires." JSME international journal. Series C, Dynamics, Control, Robotics, Design, and Manufacturing Series C, 30, No. 1 (1996):58-66. DOI: 10.1299/jsmec1993.39.58. (Year: 1996).*

(Continued)

*Primary Examiner* — Daniel M. Robert
(74) *Attorney, Agent, or Firm* — Vivacqua Crane, PLLC (57) ABSTRACT

A method includes receiving planned path data, road data, and speed profile data, determining anticipatory constraints for each of the plurality of steps along a planned path using the planned path data, the road data, and the speed profile data, determining a plurality of control actions using a Model Predictive Control (MPC). The prediction model of the MPC is updated in real time with the plurality of anticipatory constraints for each of the plurality of steps along the planned path and the road data for each of the plurality of steps along the planned path. The method further includes controlling the vehicle using the plurality of control actions to cause the vehicle to autonomously follow the planned path.

20 Claims, 2 Drawing Sheets

(56) References Cited

U.S. PATENT DOCUMENTS

2021/0373138 A1* 12/2021 Jiang .................... G01S 7/4972
2024/0157963 A1* 5/2024 Zhang ................ B60W 60/001

OTHER PUBLICATIONS

Gu, "Improved Trajectory Planning for On-Road Self-Driving Vehicles Via Combined Graph Search, Optimization & Topology Analysis," Doctoral Dissertation, Carnegie Mellon University, May 2017. (Year: 2017).*

* cited by examiner

METHOD OF ANTICIPATORY CONTROL FOR AUTOMATED DRIVING

INTRODUCTION

The present disclosure relates to systems and methods for anticipatory control for automated driving.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Autonomous vehicles include prediction models, such as Model Predictive Control, to predict the movement of the autonomous vehicle. These prediction models, however, do not consider road conditions in real time. It is therefore desirable to develop a prediction model for autonomous vehicles that considers road conditions in real time.

SUMMARY

In an aspect of the present disclosure, the method of anticipatory control for automated driving includes receiving planned path data, road data, and speed profile data. The planned path data includes information about a planned path of a vehicle, and the planned path includes a plurality of steps. The speed profile data includes the planned speed of the vehicle along the planned path. The method further includes determining a plurality of anticipatory constraints for each of the plurality of steps along the planned path using the planned path data, the road data, and the speed profile data. The anticipatory constraints include tire force limits for each of the plurality of steps of the planned path and steering limits for each of the plurality of steps of the planned path. The method further includes determining a plurality of control actions using a Model Predictive Control (MPC). The prediction model of the MPC is updated in real time with the plurality of anticipatory constraints for each of the plurality of steps along the planned path and the road data for each of the plurality of steps along the planned path. The method further includes controlling the vehicle using the plurality of control actions to cause the vehicle to autonomously follow the planned path. The method described in this paragraph improves autonomous vehicle technology by providing a more reliable and realistic prediction model that considers real time data, thereby considering future conditions of the road. For example, the method described in this paragraph considers real conditions in real time, thereby providing a realistic and reliable prediction model for the autonomous vehicle.

In an aspect of the present disclosure, the planned path includes a first path coordinate, a second path coordinate, and a path heading angle for each of the plurality of steps.

In an aspect of the present disclosure, the road data includes a road grade angle, a road bank angle, and a coefficient of friction between a plurality of tires of the vehicle and a road surface of a road for each of the plurality of steps of the planned path.

In an aspect of the present disclosure, the method further includes sequencing and synchronizing the planned path data, the road data, and the speed profile data before determining the plurality of anticipatory constraints for each of the plurality of steps along the planned path using the planned path data and before determining the plurality of control actions.

In an aspect of the present disclosure, sequencing and synchronizing the planned path data, the road data, and the speed profile data includes resampling the planned path data, the road data, and the speed profile data at a common sampling rate.

In an aspect of the present disclosure, the method further includes determining a reference trajectory for the planned path of the vehicle, wherein the reference trajectory includes a reference position, a reference velocity, and an initial steering profile for the planned path.

In an aspect of the present disclosure, the plurality of anticipatory constraints for each of the plurality of steps along the planned path is determined as a function of the coefficient of friction between the plurality of tires of the vehicle and the road surface of a road for each of the plurality of steps along the planned path, the road grade angle for each of the plurality of steps along the planned path, the road bank angle for each of the plurality of steps along the planned path, the initial steering profile, and the reference velocity.

In an aspect of the present disclosure, the plurality of anticipatory constraints for each of the plurality of steps along the planned path includes a plurality of vehicle state constraints and a plurality of control action constraints.

In an aspect of the present disclosure, determining the plurality of control actions includes determining a plurality of wheel angle commands.

In an aspect of the present disclosure, controlling the vehicle using the plurality of control actions to follow the planned path includes controlling the vehicle using the plurality of wheel angle commands.

The present disclosure also describes a tangible, non-transitory, machine-readable medium, including machine-readable instructions, that when executed by one or more processors, cause one or more processors to execute the methods described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Reference will now be made in detail to several examples of the disclosure that are illustrated in accompanying drawings. Whenever possible, the same or similar reference numerals are used in the drawings and the description to refer to the same or like parts or steps.

Figure 1:
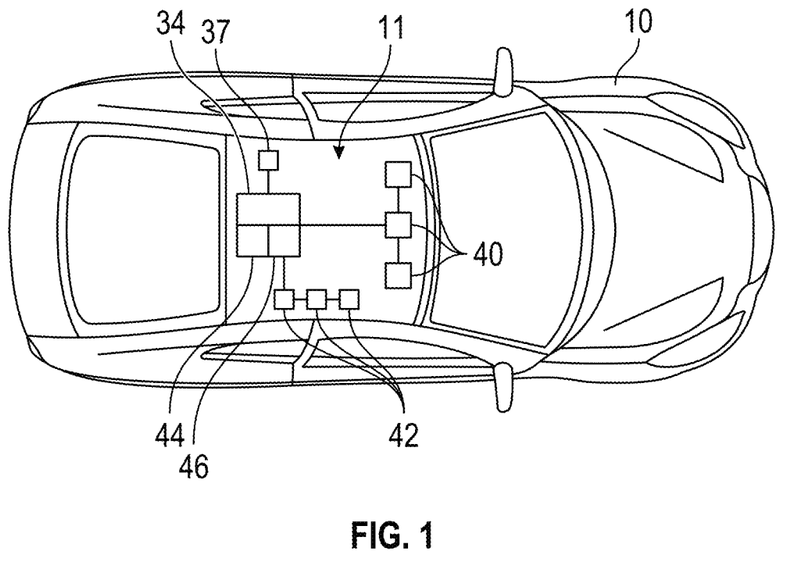
FIG. 1 is a schematic top view of a vehicle including a system for anticipatory control for automated driving.
Figure 2:
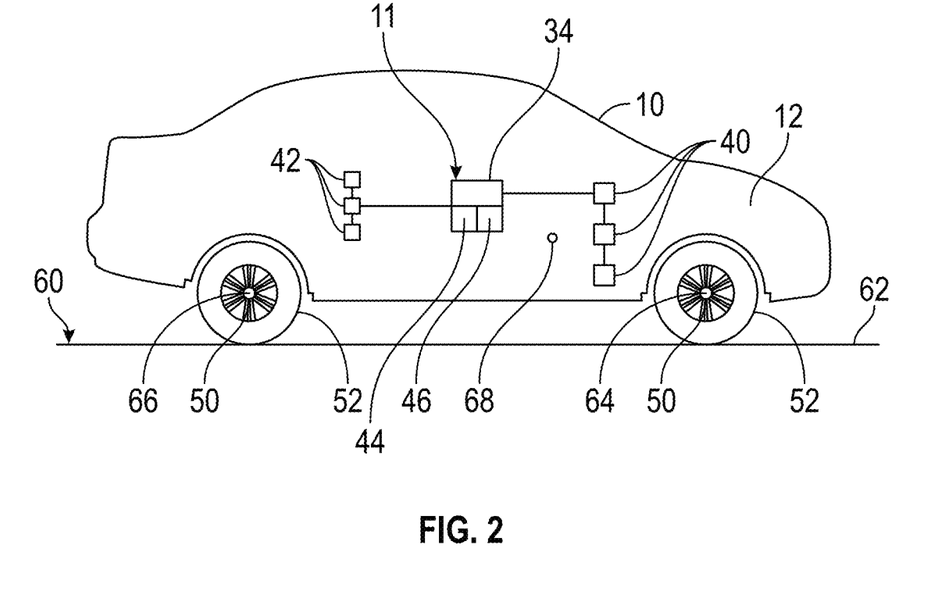
FIG. 2 is a schematic side view of the vehicle of FIG. 1.

With reference to FIGS. 1 and 2, a vehicle 10 includes (or is in communication with) a system 11 to enhance lateral assist applications in the presence of road features. While the system 11 is shown inside the vehicle 10, it is contemplated that the system 11 may be outside of the vehicle 10. As a non-limiting example, the system 11 may be a cloud-based system in wireless communication with the vehicle 10. Although the vehicle 10 is shown as a sedan, it is envisioned that that vehicle 10 may be another type of vehicle, such as a pickup truck, a coupe, a sport utility vehicle (SUVs), a recreational vehicle (RVs), etc. The vehicle 10 may be an autonomous vehicle configured to drive autonomously.

The vehicle 10 includes a controller 34 and one or more sensors 40 in communication with the controller 34. The sensors 40 collect information and generate sensor data indicative of the collected information. As non-limiting examples, the sensors 40 may include Global Navigation Satellite System (GNSS) transceivers or receivers, yaw rate sensors, speed sensors, lidars, radars, ultrasonic sensors, and cameras, among others. The GNSS transceivers or receivers are configured to detect the location of the vehicle 10 in the globe. The speed sensors are configured to detect the speed of the vehicle 10. The yaw rate sensors are configured to determine the heading of the vehicle 10. The cameras may have a field of view large enough to capture images in front, in the rear, and in the sides of the vehicle 10. The ultrasonic sensor may detect dynamic objects.

The system 11 further includes a controller 34 in communication with the sensors 40. The controller 34 includes at least one processor 44 and a non-transitory computer readable storage device or media 46. The processor 44 may be a custom-made processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media of the controller 34 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10.

Figure 3:
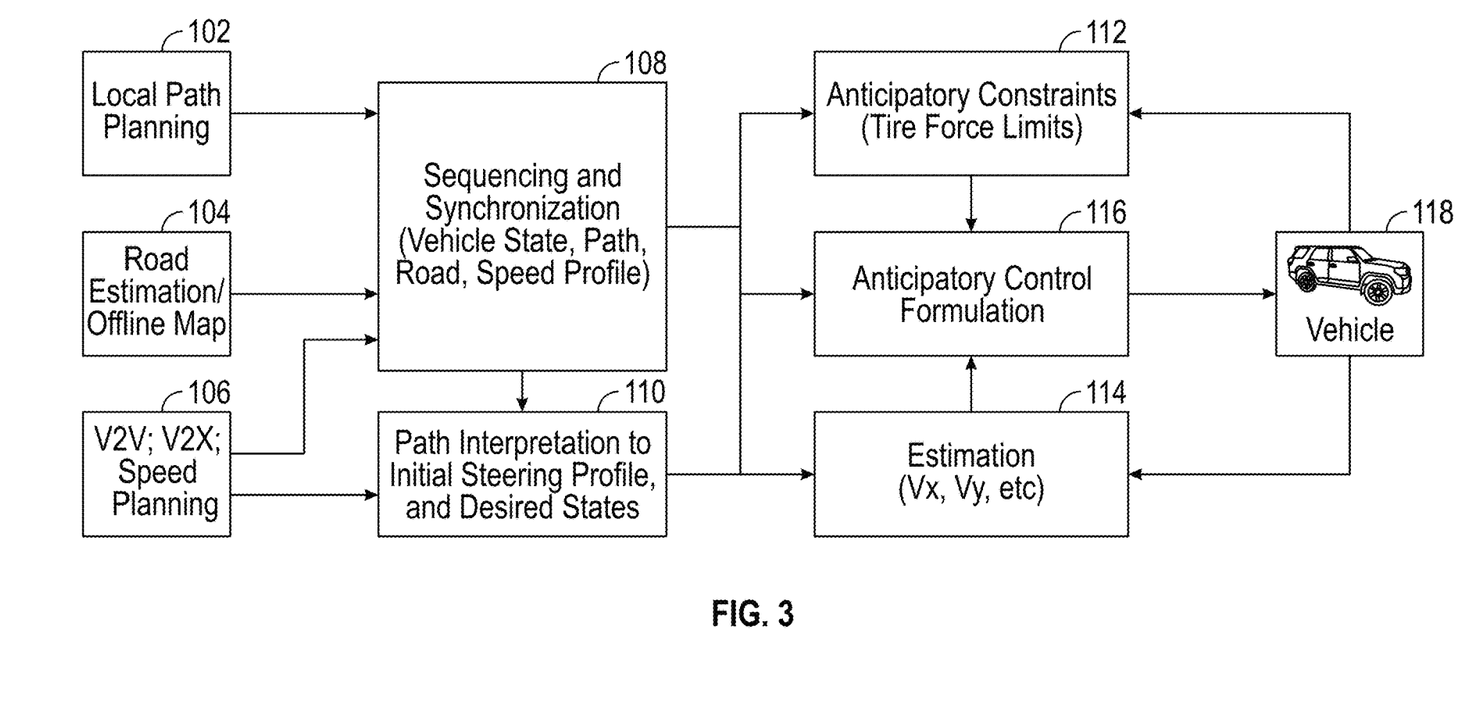
FIG. 3 is a flowchart of a method for anticipatory control for automated driving.

The instructions may include one or more separate programs, each of which comprises an ordered listing of executable instructions for implementing logical functions. The instructions, when executed by the processor 44, receive and process signals from the cameras, perform logic, calculations, methods and/or algorithms for automatically controlling the components of the vehicle 10, and generate control signals to the actuators to automatically control the components of the vehicle 10 based on the logic, calculations, methods, and/or algorithms. Although a single controller 34 is shown in FIG. 1, the system 11 may include a plurality of controllers 34 that communicate over a suitable communication medium or a combination of communication mediums and that cooperate to process the sensor signals, perform logic, calculations, methods, and/or algorithms, and generate control signals to automatically control features of the system 11. In various embodiments, one or more instructions of the controller 34 are embodied in the system 11. The non-transitory computer readable storage device or media 46 includes machine-readable instructions (shown, for example, in FIG. 3), that when executed by the one or more processors, cause the processors 44 to execute the method 100 (FIG. 3).

The vehicle 10 may include one or more communication transceivers 37 in communication with the controller 34. Each of the communication transceivers 37 is configured to wirelessly communicate information to and from other remote entities, such as the remote vehicles, (through "V2V" communication), infrastructure (through "V2I" communication), remote systems at a remote call center (e.g., ON-STAR by GENERAL MOTORS, and/or personal electronic devices, such as a smart phone. The communication transceivers 37 may be configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication transceivers 37 may include one or more antennas for receiving and/or transmitting signals, such as cooperative sensing messages (CSMs). The communication transceivers 37 may be considered sensors 40 and/or sources of data. The remote vehicles may include one or more communication transceivers 37 as described above with respect to the vehicle 10.

The vehicle 10 includes one or more actuators 42 in communication with the controller 34. The actuators 42 control one or more vehicle features such as, but not limited to, a propulsion system, a transmission system, a steering system, and a brake system. The vehicle features may further include interior and/or exterior vehicle features such as, but are not limited to, doors, a trunk, and cabin features such as air, music, lighting, etc.

The vehicle 10 also includes a vehicle body 12 and one or more wheels 50 coupled to the vehicle body 12. At least one of the wheels 50 is configured to turn relative to the vehicle body 12 to steer the vehicle 10. Each of the wheels 50 is surrounded by a tire 52. The tires 52 are configured to contact a road surface 60 of a road 32 to provide traction.

With reference to FIG. 2, a method 100 for anticipatory control for automated driving. The method 200 begins at block 102, block 104, and block 106. At block 102, the controller 34 plans a local path for the vehicle 10. The term local path is local because it only extends a predetermined local distance (e.g., five miles) and includes a plurality of steps. Then, the controller 34 generates planned path data, which includes information about the planned local path for the vehicle 10. The planned path data includes a first path coordinate (i.e., an x-coordinate), a second path coordinate (i.e., a y-coordinate), and a path heading angle for each of the steps of the planned path.

At block 104, the controller 34 determines (e.g., estimates) the road conditions using one or more sensors 40 (e.g., cameras) and/or offline maps stored, for example, in the non-transitory computer readable storage device or media 46. For example, the controller 34 may identify potholes along the road 62 using the sensors 40. Further, the controller 34 generates road data, which is indicative of the road conditions of the road 62. As non-limiting examples, the road data may include a road grade angle for each step of the planned path, a road bank angle for each step of the planned path, a coefficient of friction between the tires 52 of the vehicle 10 and the road surface 60 of the road 62 for each step of the planned path, and the presence (or not) of a pothole in each step of the planned path.

At block 106, the controller 34, the controller 34 determines a planned speed profile along the planned local path. In other words, the controller 34 performs speed planning for each step of the planned local path. To do so, the controller 34 considers, for example, speed limits along the planned local path and the speed of other vehicles along the planned local path. The speed limits and the speed of other vehicles may be obtained from V2V communication and/or V2I communications received by the controller through the communication transceivers 37. The planned speed profile along the planned local path may be configured as speed profile data. After executing blocks 102, 104, and 106, the method 100 continues to block 108.

At block 108, the controller 34 sequences and synchronizes the planned path data, the road data, and the speed profile data. It is useful to sequence and synchronize the planned path data, the road data, and the speed profile data that will serve as inputs for the Model Predictive Control (MPC). MPC is a discrete-time multi-variable control architecture and updated in real time with the anticipatory constraints for each of the plurality of steps along the planned path and the road data for each of the plurality of steps along the planned path. At each control interval (i.e., each step), an MPC controller (i.e., controller 34) uses an internal model to predict future plant behavior. The MPC includes an optimizer and a prediction model. Based on the MPC prediction, the controller 34 computes optimal control actions. At block 106, the controller 34 resamples the planned path data, the road data, and the speed profile data at a common sampling rate. The controller 34 determines if there is any offset among the planned path data, the road data, and the speed profile data. Then, the controller 34 synchronizes the planned path data, the road data, and the speed profile data to minimize the offset. Next, the method 100 continues to block 110.

At block 110, the controller 34 interprets to planned path to determine a reference trajectory and desired vehicle states for the planned path of the vehicle. The reference trajectory includes a reference position, a reference velocity, and an initial steering profile for the planned path the vehicle takes along the path. The reference trajectory and the desired vehicle states may be obtained using an offline bicycle model and/or a quasi-stationary approach. At block 110, controller 34 may use the following equations of the offline bicycle model:

$$V_y = -r + \rho V_x \qquad \text{Eq. 1}$$

$$r = \frac{C_r L}{I_z V_x^2} V_y - \frac{bLC_r}{I_z V_x^2} r + \frac{aM}{I_z} \rho V_x \qquad \text{Eq. 2}$$

$$\delta_f = \frac{C_f + C_r}{C_f V_x} V_y + \frac{C_f a - C_r b}{C_f V_x} r + \frac{M}{C_f} \rho V_x^2 \qquad \text{Eq. 3}$$

$$\Delta \psi = -\frac{V_y}{V_x} \qquad \text{Eq. 4}$$

where:
M is the total mass of the vehicle 10;
$\delta_f$ is the initial road wheel angle command;
r is the yaw rate of the vehicle 10;

$V_x$ is the longitudinal speed of the vehicle 10;
$C_r$ is the tire cornering stiffness of the rear tires 52;
$C_f$ is the tire cornering stiffness of the front tires 52;
$\rho$ is the curvature of the road 62;
$V_y$ is the lateral speed of the vehicle;
L is the distance from the front axle 64 to the rear axle 66 of the vehicle 10;
$I_z$ is the yaw inertia of the vehicle 10;
a is the distance from the center of gravity 68 of the vehicle 10 the front axle 64 of the vehicle 10;
b is the distance from the center of gravity 68 of the vehicle 10 to the rear axle 66 of the vehicle 10; and
$\Delta \psi$ is the heading orientation error of the vehicle 10 with respect to the centerline of the road 62.

At block 110, the controller 34 may use the following equations of quasi-stationary approach:

$$\Delta y = 0 \qquad \text{Eq. 5}$$

$$\Delta \psi = -\left(b - \frac{MaV_x^2}{LC_r}\right)\rho \qquad \text{Eq. 6}$$

$$V_y = \left(b - \frac{MaV_x^2}{LC_r}\right)\rho V_x \qquad \text{Eq. 7}$$

$$r = \rho V_x \qquad \text{Eq. 8}$$

where:
$\Delta y$ is the orthogonal distance from the center of gravity 68 of the vehicle 10 to the centerline of the road 62;
$\Delta \psi$ is the heading orientation error of the vehicle 10 with respect to the centerline of the road 62;
r is the yaw rate of the vehicle 10;
$V_x$ is the longitudinal speed of the vehicle 10;
$\rho$ is the curvature of the road 62;
b is the distance from the center of gravity 68 of the vehicle 10 to the rear axle 66 of the vehicle 10;
M is the total mass of the vehicle 10;
L is the distance from the front axle 64 to the rear axle 66 of the vehicle 10;
$C_r$ is the tire cornering stiffness of the rear tires 52; and
a is the distance from the center of gravity 68 of the vehicle 10 the front axle 64 of the vehicle 10.

At block 110, the controller 34 uses the equations above for the offline bicycle model and/or a quasi-stationary approach to determine the desired vehicle state for each step of the planned local path. The desired vehicle states for each step of the planned local path includes, but is not limited to, the vehicle yaw rate for each step of the planned local path, the lateral velocity for each step of the planned local path, the heading orientation error of the vehicle 10 with respect to the centerline of the road 62 for each step of the planned local path, the initial road wheel angle command for each step of the planned local path, and the orthogonal distance from the center of gravity 68 of the vehicle 10 to the centerline of the road 62 for each step of the planned local path. Then, the method 100 continues to block 114.

At block 112, the controller 34 determines a plurality of anticipatory constraints for each step along the planned local path using the planned path data, the road data, and the speed profile data. The anticipatory constraints include tire force limits for each step of the planned local path and steering limits for each step of the planned local path. The anticipatory constraints for each steps along the planned local path are determined as a function of the coefficient of friction between the tires 52 of the vehicle 10 and the tires 52 of the vehicle 10 for each step along the planned path, the road grade angle for each step along the planned local path, the road bank angle for each step along the planned local path, the initial steering profile, and the reference velocity. The anticipatory constraints include vehicle state constraints for each step along the planned local path and control action constraints along the planned local path. For example, the yaw rate is bounded according to the following equation:

$$|r| \leq \frac{(\mu - \sin(\phi))g}{v_x} \quad \text{Eq. 9}$$

where:

$\mu$ is the coefficient of friction between the tires 52 of the vehicle 10 and the road surface 60 of the road 62;

$v_x$ is the longitudinal velocity of the vehicle 10; and g is the gravitational constant;

$\phi$ is the road bank angle of the road 62; and r is the yaw rate of the vehicle 10.

The equation 9 is used for each step along the planned local path. The anticipatory constraints may be updated, in real time, based on the sensor data received from the sensors 40 of the vehicle 10 while the vehicle 10 is moving along the planned local path.

The method 100 also includes block 114. At block 114, the controller 34 estimates the lateral velocity and the longitudinal velocity of the vehicle 10 at each step of the planned local path. The lateral velocity and the longitudinal velocity of the vehicle 10 at each step of the planned local path may have already been determined at block 110 and, therefore, block 114 serves as input to block 116. Further, the lateral velocity and the longitudinal velocity of the vehicle 10 may be updated, in real time, based on the sensor data obtained from the vehicle 10 while the vehicle 10 moves along the planned local path.

At block 116, the controller 34 determines a plurality of control actions using the plurality of anticipatory constraints for each step of the planned local path using the planned path data, the road data, and the speed profile data. The controller 34 uses an MPC at block 116 but the prediction model of the MPC is updated at each step of the planned local path. The MPC includes a system matrix, a control input matrix, and a disturbance term. The system matrix and the control input matrix are part of the prediction model of the MPC and are updated at each step of the planned local path and may be defined by the following equations:

$$A = \begin{bmatrix} 0 & \cos\psi & 0 & 0 \\ 0 & -\frac{\overline{C}_f \cos\delta_f + \overline{C}_r}{mv_x} & 0 & -v_x - \frac{\overline{C}_f a \cos\delta_f - \overline{C}_r b}{mv_x} \\ 0 & 0 & 0 & 1 \\ 0 & -\frac{\overline{C}_f a \cos\delta_f - \overline{C}_r b}{I_z v_x} & 0 & -\frac{\overline{C}_f a^2 \cos\delta_f + \overline{C}_r b^2}{I_z v_x} \end{bmatrix} \quad \text{Eq. 10}$$

$$B = \begin{bmatrix} 0 & 0 & 0 \\ \frac{\overline{C}_f \cos\delta_f}{m} & \frac{\overline{C}_r}{m} & 0 \\ 0 & 0 & 0 \\ \frac{a\overline{C}_f \cos\delta_f}{I_z} & -\frac{b\overline{C}_r}{I_z} & \frac{1}{I_z} \end{bmatrix} \quad \text{Eq. 11}$$

where:

$\phi$ is the road bank angle of the road 62;

m is the total mass of the vehicle 10;

$C_r$ is the tire cornering stiffness of the rear tires 52;

$C_f$ is the tire cornering stiffness of the front tires 52;

$\delta_r$ is the initial road wheel angle command;

$I_z$ is the yaw inertia of the vehicle 10;

a is the distance from the center of gravity 68 of the vehicle 10 the front axle of the vehicle 10;

b is the distance from the center of gravity 68 of the vehicle 10 to the rear axle 66 of the vehicle 10;

$\psi$ is the vehicle heading angle of the vehicle 10;

$v_x$ is the planned longitudinal speed;

B is the control input matrix; and

A is the system matrix.

The system matrix A and the control input matrix B should be updated at each step of the planned local using the planned longitudinal speed, the initial road wheel angle command (i.e., the initial steering angle), and the cornering stiffness of the tires 52. The update of the cornering stiffness of the tires 52 at each step of the planned local path may consider the coefficient of friction between the tires 52 of the vehicle 10 and the road surface 60 of the road 62 at each step of the planned path. At block 116, the controller 34 formulates the anticipatory control as a real time optimization problem using the following equations:

$$u^* = \arg\min: J(x(t), U_t) = \Sigma_{k=1}^{N_p} \|y_{t+k,t} - y_{dt+k,t}\|_Q^2 + \Sigma_{k=0}^{N_p-1} \|u_{t+k,t}\|_R^2 + \Sigma_{k=0}^{N_p-1} \|\Delta u_{t+k,t}\|_T^2 \quad \text{Eq. 12}$$

$$x_{k+1|t} = A x_{k|t} + B u_{k|t} + \omega \quad \text{Eq. 13}$$

$$x_{k|t} \in X \; k=t+1, \ldots t+N_p \quad \text{Eq. 14}$$

$$u\_(k|t) \in U \; k=t+1, \ldots t+N\_c-1 \quad \text{Eq. 15}$$

where:

J(x(t), $U_t$) is the cost function;

$y_t$ is the predicted vehicle state values;

$y_d$ is the desired vehicle state values;

$u_t$ are the control actions;

$\Delta u$ is the change rate of the control action;

u* is the optimal control action;

t is a timestamp of the current state;

$N_p$ is the prediction step of the planned local path;

Q is the weight for the tracking errors;

R is the weight for the control actions;

T is the weight for the change rate of the control actions;

$x_{k+1|t}$ is a predicted future vehicle state with respect to the planned local path at step k+1;

A is the time-varying system matrix;

X are the vehicle state constraints set;

B is the time-varying control input matrix; and

U are control action constraints set.

Then, at block 116, the controller 34 solves the constraint optimization problem, in real time using, for example, a quadratic programming to determine the control actions at each step of the planned local path. As a non-limiting example, the control actions include one or more wheel angle commands.

Then, the method 100 continues to block 118. At block 118, the controller 34 controls the vehicle 10 using the plurality of control actions to cause the vehicle 10 to autonomously follow the planned local path. As discussed above, the control actions include one or more wheel angle commands. Also at block 118, the sensors 40 of the vehicle 10 update the longitudinal vehicle velocity, the lateral vehicle velocity, and the road data in real time for each step of the planned local path.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method of anticipatory control for automated driving, comprising:
receiving planned path data, road data, and speed profile data, wherein the planned path data includes information about a planned path of a vehicle, and the planned path includes a plurality of steps, and the speed profile data includes a planned speed of the vehicle along the planned path;
determining a plurality of anticipatory constraints for each of the plurality of steps along the planned path using the planned path data, the road data, and the speed profile data, wherein the anticipatory constraints include tire force limits for each of the plurality of steps of the planned path and steering limits for each of the plurality of steps of the planned path;
determining a plurality of control actions using a Model Predictive Control (MPC), wherein a prediction model of the MPC is updated in real time with the plurality of anticipatory constraints for each of the plurality of steps along the planned path and the road data for each of the plurality of steps along the planned path; and
determining a reference trajectory for the planned path of the vehicle, wherein the reference trajectory includes a reference position, a reference velocity, and an initial steering profile for the planned path, wherein the reference trajectory and desired vehicle states are obtained using one or more of an offline bicycle model and a quasi-stationary approach,
wherein the offline bicycle model operates according to:

$$v_y = -r + \rho V_x \qquad \text{Eq. 1}$$

$$r = C_r L/I_z V_x^2 V_y - bLC_r/I_z V_x^2 r + aM/I_z \rho V_x \qquad \text{Eq. 2}$$

$$\delta_f = C_f + C_r/C_f V_x V_y + C_f a - C_r b/C_f V_x r + M/C_f \rho V_x^2 \qquad \text{Eq. 3}$$

$$\Delta \psi = -V_y V_x \qquad \text{Eq. 4}$$

where:
M is a total mass of the vehicle; $\delta_f$ is an initial road wheel angle command; r is a yaw rate of the vehicle; $V_x$ is a longitudinal speed of the vehicle; $C_r$ is a tire cornering stiffness of rear tires of the vehicle; $C_f$ is a tire cornering stiffness of front tires of the vehicle; $\rho$ is a curvature of the road; $V_y$ is a lateral speed of the vehicle; L is a distance from a front axle to a rear axle of the vehicle; $I_z$ is a yaw inertia of the vehicle; a is the distance from a center of gravity of the vehicle to the front axle of the vehicle; b is a distance from the center of gravity of the vehicle to the rear axle of the vehicle; and $\Delta\psi$ is a heading orientation error of the vehicle with respect to a centerline of the road, and wherein the quasi-stationary approach operates according to:

$$\Delta y = 0 \qquad \text{Eq. 5}$$

$$\Delta\psi = -(b - MaV_x^2/LC_r)\rho \qquad \text{Eq. 6}$$

$$V_y = (b - MaV_x^2/LC_r)\rho V_x \qquad \text{Eq. 7}$$

$$r = \rho V_x \qquad \text{Eq. 8}$$

where: $\Delta y$ is an orthogonal distance from the center of gravity of the vehicle to the centerline of the road; $\Delta\psi$ is the heading orientation error of the vehicle with respect to the centerline of the road; r is the yaw rate of the vehicle; $V_x$ is the longitudinal speed of the vehicle; $\rho$ is the curvature of the road; b is the distance from the center of gravity of the vehicle to the rear axle of the vehicle; M is the total mass of the vehicle; L is the distance from the front axle to the rear axle of the vehicle; $C_r$ is the tire cornering stiffness of the rear tires; and a is the distance from the center of gravity of the vehicle the front axle of the vehicle; and controlling the vehicle using the plurality of control actions to cause the vehicle to autonomously follow the planned path.

2. The method of claim 1, wherein the planned path includes a first path coordinate, a second path coordinate, and a path heading angle for each of the plurality of steps.

3. The method of claim 2, wherein the road data includes a road grade angle, a road bank angle, and a coefficient of friction between a plurality of tires of the vehicle and a road surface of a road for each of the plurality of steps of the planned path.

4. The method of claim 3, further comprising sequencing and synchronizing the planned path data, the road data, and the speed profile data before determining the plurality of anticipatory constraints for each of the plurality of steps along the planned path using the planned path data and before determining the plurality of control actions.

5. The method of claim 4, wherein sequencing and synchronizing the planned path data, the road data, and the speed profile data includes resampling the planned path data, the road data, and the speed profile data at a common sampling rate.

6. The method of claim 5, further comprising determining the reference trajectory for the planned path of the vehicle, wherein the reference trajectory includes a reference position, a reference velocity, and the initial steering profile for the planned path.

7. The method of claim 6, wherein the plurality of anticipatory constraints for each of the plurality of steps along the planned path is determined as a function of the coefficient of friction between the plurality of tires of the vehicle and the road surface of a road for each of the plurality of steps along the planned path, the road grade angle for each of the plurality of steps along the planned path, the road bank angle for each of the plurality of steps along the planned path, the initial steering profile, and the reference velocity.

8. The method of claim 7, wherein the plurality of anticipatory constraints for each of the plurality of steps along the planned path includes a plurality of vehicle state constraints and a plurality of control action constraints, wherein a yaw rate (r) of the vehicle is bounded according to:

$$|r| \leq (\mu - \sin(\phi))g/v_x$$

where: $\mu$ is the coefficient of friction between tires of the vehicle and a road surface; $v_x$ is a longitudinal velocity of the vehicle; g is the gravitational constant; $\phi$ is the road bank angle of the road.

9. The method of claim 8, wherein determining the plurality of control actions includes determining a plurality of wheel angle commands.

10. The method of claim 9, wherein controlling the vehicle using the plurality of control actions to follow the planned path includes controlling the vehicle using the plurality of wheel angle commands.

11. A tangible, non-transitory, machine-readable medium, comprising machine-readable instructions, that when executed by a processor, cause the processor to:

receive planned path data, road data, and speed profile data, wherein the planned path data includes information about a planned path of a vehicle, and the planned path includes a plurality of steps, and the speed profile data includes a planned speed of the vehicle along the planned path;

determine a plurality of anticipatory constraints for each of the plurality of steps along the planned path using the planned path data, the road data, and the speed profile data, wherein the anticipatory constraints include tire force limits for each of the plurality of steps of the planned path and steering limits for each of the plurality of steps of the planned path;

determine a plurality of control actions using Model Predictive Control (MPC), wherein a prediction model of the MPC is updated in real time with the plurality of anticipatory constraints for each of the plurality of steps along the planned path and the road data for each of the plurality of steps along the planned path;

determine a reference trajectory for the planned path of the vehicle, wherein the reference trajectory includes a reference position, a reference velocity, and an initial steering profile for the planned path, wherein the reference trajectory and desired vehicle states are obtained using one or more of an offline bicycle model and a quasi-stationary approach, wherein the offline bicycle model operates according to:

$$v_y = -r + \rho V_x \qquad \text{Eq. 1}$$

$$r = C_r L/I_z V_x^2 V_y - bLC_r/I_z V_x^2 r + aM/I_z \rho V_x \qquad \text{Eq. 2}$$

$$\delta_f = C_f + C_r/C_f V_x V_y + C_f \alpha - C_r b/C_f V_x r + M/C_f \rho V_x^2 \qquad \text{Eq. 3}$$

$$\Delta\psi = -V_y V_x \qquad \text{Eq. 4}$$

where: M is a total mass of the vehicle; $\delta_f$ is an initial road wheel angle command; r is a yaw rate of the vehicle; $V_x$ is a longitudinal speed of the vehicle; $C_r$ is a tire cornering stiffness of rear tires of the vehicle; $C_f$ is a tire cornering stiffness of front tires of the vehicle; $\rho$ is a curvature of the road; $V_y$ is a lateral speed of the vehicle; L is a distance from a front axle to a rear axle of the vehicle; $I_z$ is a yaw inertia of the vehicle; a is the distance from a center of gravity of the vehicle to the front axle of the vehicle; b is a distance from the center of gravity of the vehicle to the rear axle of the vehicle; and $\Delta\psi$ is a heading orientation error of the vehicle with respect to a centerline of the road, and wherein the quasi-stationary approach operates according to:

$$\Delta y = 0 \qquad \text{Eq. 5}$$

$$\Delta\psi = -(b - MaV_x^2/LC_r)\rho \qquad \text{Eq. 6}$$

$$V_y = (b - MaV_x^2/LC_r)\rho V_x \qquad \text{Eq. 7}$$

$$r = \rho V_x \qquad \text{Eq. 8}$$

where: Δy is an orthogonal distance from the center of gravity of the vehicle to the centerline of the road; Δψ is the heading orientation error of the vehicle with respect to the centerline of the road; r is the yaw rate of the vehicle; $V_x$ is the longitudinal speed of the vehicle; ρ is the curvature of the road; b is the distance from the center of gravity of the vehicle to the rear axle of the vehicle; M is the total mass of the vehicle; L is the distance from the front axle to the rear axle of the vehicle; $C_r$ is the tire cornering stiffness of the rear tires; and a is the distance from the center of gravity of the vehicle the front axle of the vehicle; and control the vehicle using the plurality of control actions to cause the vehicle to autonomously follow the planned path.

12. The tangible, non-transitory, machine-readable medium of claim 11, wherein the planned path includes a first path coordinate, a second path coordinate, and a path heading angle for each of the plurality of steps.

13. The tangible, non-transitory, machine-readable medium of claim 12, wherein the road data includes a road grade angle, a road bank angle, and a coefficient of friction between a plurality of tires of the vehicle and a road surface of a road for each of the plurality of steps of the planned path.

14. The tangible, non-transitory, machine-readable medium of claim 13, wherein the tangible, non-transitory, machine-readable medium further comprises machine-readable instructions, that when executed by the processor, causes the processor to:

sequence and synchronize the planned path data, the road data, and the speed profile data before determining the plurality of anticipatory constraints for each of the plurality of steps along the planned path using the planned path data and before determining the plurality of control actions.

15. The tangible, non-transitory, machine-readable medium of claim 14, wherein the tangible, non-transitory, machine-readable medium further comprises machine-readable instructions, that when executed by the processor, causes the processor to:

resample the planned path data, the road data, and the speed profile data with a common sampling rate.

16. The tangible, non-transitory, machine-readable medium of claim 15, wherein the tangible, non-transitory, machine-readable medium further comprises machine-readable instructions, that when executed by the processor, causes the processor to:

determine the reference trajectory for the planned path of the vehicle, wherein the reference trajectory includes a reference position, a reference velocity, and the initial steering profile for the planned path.

17. The tangible, non-transitory, machine-readable medium of claim 16, wherein the plurality of anticipatory constraints for each of the plurality of steps along the planned path is determined as a function of the coefficient of friction between the plurality of tires of the vehicle for each of the plurality of steps along the planned path and the road grade angle for each of the plurality of steps along the planned path, the road bank angle for each of the plurality of steps along the planned path, the initial steering profile, and the reference velocity.

18. The tangible, non-transitory, machine-readable medium of claim 17, wherein the plurality of anticipatory constraints for each of the plurality of steps along the planned path includes a plurality of vehicle state constraints and a plurality of control action constraints; wherein a yaw rate is bounded according to:

$$|r| \le (\mu - \sin(\phi)) g / v_x \qquad \text{Eq. 9}$$

where: μ is the coefficient of friction between the tires of the vehicle and the road surface of the road; $v_x$ is a longitudinal velocity of the vehicle; g is the gravitational constant; φ is the road bank angle of the road; and r is the yaw rate of the vehicle.

19. The tangible, non-transitory, machine-readable medium of claim 18, wherein the plurality of control actions includes a plurality of wheel angle commands.

20. The tangible, non-transitory, machine-readable medium of claim 19, wherein the tangible, non-transitory, machine-readable medium further comprises machine-readable instructions, that when executed by the processor, causes the processor to:

control the vehicle using the plurality of wheel angle commands.

* * * * *